United States Patent
Batista et al.

(10) Patent No.: US 11,492,238 B2
(45) Date of Patent: Nov. 8, 2022

(54) ELEVATOR BRAKE

(71) Applicant: Otis Elevator Company, Farmington, CT (US)

(72) Inventors: Ramon Jesus Batista, Madrid (ES); Borja de Diego Restrepo, Madrid (ES)

(73) Assignee: OTIS ELEVATOR COMPANY, Farmington, CT (US)

(\*) Notice: Subject to any disclaimer, the term of this patent is extended or adjusted under 35 U.S.C. 154(b) by 446 days.

(21) Appl. No.: 16/657,538

(22) Filed: Oct. 18, 2019

(65) Prior Publication Data
US 2020/0122986 A1 Apr. 23, 2020

(30) Foreign Application Priority Data
Oct. 19, 2018 (EP) .................................... 18201477

(51) Int. Cl.
*B66D 5/14* (2006.01)
*B66D 5/30* (2006.01)
*F16D 121/22* (2012.01)

(52) U.S. Cl.
CPC ................. *B66D 5/14* (2013.01); *B66D 5/30* (2013.01); *F16D 2121/22* (2013.01)

(58) Field of Classification Search
CPC .......... B66D 5/14; B66D 5/30; F16D 65/125; F16D 2121/22; F16D 2200/0004
See application file for complete search history.

(56) References Cited

U.S. PATENT DOCUMENTS

| 5,407,035 | A | | 4/1995 | Cole et al. |
| 5,526,914 | A | \* | 6/1996 | Dwivedi ............... F16D 65/127 188/218 XL |
| 5,620,791 | A | \* | 4/1997 | Dwivedi ............... F16D 65/125 428/323 |
| 6,284,014 | B1 | | 9/2001 | Carden |
| 6,675,939 | B2 | | 1/2004 | Maurice et al. |
| 6,896,098 | B2 | | 5/2005 | Vom Stein et al. |
| 8,771,573 | B2 | | 7/2014 | Knuttel et al. |
| 9,457,786 | B2 | \* | 10/2016 | Baumgartner .......... B60T 17/22 |
| 9,695,892 | B2 | | 7/2017 | Meyer et al. |
| 10,125,256 | B2 | \* | 11/2018 | Becquet ............... F16D 69/026 |
| 10,274,031 | B1 | \* | 4/2019 | Chung .................... C23C 8/02 |
| 10,663,023 | B2 | \* | 5/2020 | Zandbergen ........... B23P 15/18 |
| 2003/0070891 | A1 | | 4/2003 | Nakao et al. |

(Continued)

FOREIGN PATENT DOCUMENTS

CN 102198907 A 9/2011
CN 204239528 U 4/2015
(Continued)

OTHER PUBLICATIONS

Arun, M., et al., "Structural and Thermal Analysis of Disc Brake Made up of Nylon 6,6 Material", www.ijariie.com, IJARIIE-ISSN(O)-2395-4396, vol. 4 Issue-2 2018, 8 pages.
(Continued)

*Primary Examiner* — Thomas W Irvin
(74) *Attorney, Agent, or Firm* — Cantor Colburn LLP

(57) ABSTRACT

An elevator brake (20) has at least one brake disc (30) comprising a metal matrix composite, the metal matrix composite including at least an aluminum alloy and silicon carbide. The metal matrix composite in particular comprises Aluminum 6061, silicon carbide and redmud.

18 Claims, 3 Drawing Sheets

(56) References Cited

U.S. PATENT DOCUMENTS

| | | |
|---|---|---|
| 2005/0183909 A1 | 8/2005 | Rau et al. |
| 2010/0084232 A1* | 4/2010 | Subramanian ........ F16D 69/026 188/251 A |
| 2010/0084233 A1* | 4/2010 | Subramanian ........ F16D 69/026 523/156 |
| 2013/0037360 A1* | 2/2013 | Chen .................... F16D 69/026 523/156 |
| 2015/0027817 A1* | 1/2015 | Baumgartner ............ G01L 5/28 73/121 |
| 2016/0348744 A1 | 12/2016 | Broda et al. |
| 2017/0022355 A1* | 1/2017 | Becquet ................ F16D 69/026 |
| 2017/0122392 A1* | 5/2017 | Lembach ................ F16D 69/04 |
| 2017/0175834 A1* | 6/2017 | Bracamonte ........... B22D 23/06 |
| 2018/0209498 A1* | 7/2018 | Zandbergen ............ B33Y 10/00 |
| 2018/0209501 A1* | 7/2018 | Galimberti ............ F16D 55/225 |
| 2019/0360544 A1* | 11/2019 | Santamaria Razo ... F16D 55/22 |
| 2021/0207670 A1* | 7/2021 | Qi ........................ F16D 65/127 |
| 2021/0207672 A1* | 7/2021 | Ueki .................... F16D 69/026 |

FOREIGN PATENT DOCUMENTS

| | | |
|---|---|---|
| CN | 105673739 A | 6/2016 |
| CN | 105731227 A | 7/2016 |
| CN | 108285103 A | 7/2018 |
| DE | 102011012135 A1 | 8/2012 |
| EP | 2473750 B1 | 11/2013 |
| WO | 9519510 A1 | 7/1995 |
| WO | 2018115813 A1 | 6/2018 |

OTHER PUBLICATIONS

European Search Report for application EP 18201477.9, dated May 8, 2019, U321580EP, 8 pages.
Sireesha, S., et al., "Application of Metal Matrix Composites to reduce stress in Disc Brake Rotor using FEA", International Journal of Scientific & Engineering Research, vol. 7, Issue 3, Mar. 2016, 5 pages.

* cited by examiner

ELEVATOR BRAKE

FOREIGN PRIORITY

This application claims priority to European Patent Application No. 18201477.9 filed Oct. 19, 2018, and all the benefits accruing therefrom under 35 U.S.C. § 119, the contents of which in its entirety are herein incorporated by reference.

BACKGROUND

The invention relates to an elevator brake which is configured for braking the movement of an elevator car and/or holding the elevator car at a desired position, in particular at a landing.

An elevator system typically comprises at least one elevator car moving along a hoistway extending between a plurality of landings. An elevator system further comprises an elevator drive for driving the elevator car, and at least one elevator brake configured for braking the movement of the elevator car. In order to allow a safe operation of the elevator system, elevator brakes are usually able to generate large braking forces which allow braking the elevator car in a short period of time.

As the elevator brakes usually use frictional forces for braking the elevator car, applying large braking forces may result in high temperatures, in particular when the elevator car moves with high speed. High temperatures may damage components of the elevator brake. Large frictional forces may further result in high wear of the components of the elevator brake.

Therefore, it is desirable to provide a long-living and inexpensive elevator brake which allows braking even fast moving elevator cars without overheating.

BRIEF DESCRIPTION

According to an exemplary embodiment of the invention, an elevator brake has at least one brake disc comprising, or consisting of, a metal matrix composite, with the metal matrix composite including at least an aluminum alloy and silicon carbide (SiC).

A brake disc according to an exemplary embodiment of the invention has low wear and allows for a good and fast distribution and dissipation of heat generated when the elevator brake is operated. An elevator brake comprising such a brake disc provides a high braking capacity which allows braking an elevator car from high speeds to stop without overheating.

Exemplary embodiments further include an elevator system comprising an elevator brake according to an exemplary embodiment of the invention. In such an elevator system, the elevator car may be moved at high speeds without compromising the safety of the elevator system.

A number of optional features are set out in the following. These features may be realized in particular embodiments, alone or in combination with any of the other features, unless specified otherwise.

In addition to aluminum, the aluminum alloy may comprise magnesium and silicon as its major alloying components. The aluminum alloy in particular may be Aluminum 6061. Although having a low weight, Aluminum 6061 has been proven as being very suitable for the desired purpose of providing an elevator brake having a high braking capacity and a longs service life. A particular advantage of Aluminum 6061 is its high thermal conductivity.

The metal matrix composite may comprise between 3% and 25% of silicon carbide, the metal matrix composite in particular may comprise between 10% and 20% of silicon carbide, more particularly 15% of silicon carbide. A metal matrix composite comprising between 3% and 25%, in particular 10% to 20%, more particularly 15%, of silicon carbide has been shown as being well suited for providing an elevator brake with a high braking capacity and good thermal characteristics. In the context of this application, all percentages given for the components refer to percentage by weight.

The metal matrix composite may additionally comprise redmud. Redmud mainly comprises iron oxide(s) as its main component. Additional components may include aluminum oxide. The metal matrix composite in particular may comprise 7% to 10% of redmud. More specifically, the metal matrix composite may comprise 8% to 9%, e.g. 8.5% of redmud. Adding redmud to the metal matrix composite has been shown as enhancing the properties of the metal matrix composite for the desired purpose.

The at least one brake disc may be manufactured employing a sinterization process. Sinterization allows for a cost-efficient production of the at least one brake disc.

The at least one brake disc may comprise a friction enhancing lining in order to increase its braking capacity.

The elevator brake may comprise a casing made of a material including polyamide. The casing in particular may be made of polyamide. Polyamide allows providing a casing having the desired properties, in particular the desired strength and rigidity, and a low weight. Thus, by using polyamide for the casing, the weight of the elevator brake may be reduced without deteriorating structural or thermal characteristics of the elevator brake.

The elevator brake may comprise an electromagnet configured for activating and/or deactivating the elevator brake. The electromagnet may include an electric coil and (optionally) a magnetic core. The electric coil may consist of a plurality of metallic windings, in particular of copper windings. The magnetic core may be made of a material including magnetic steel or silicon steel, the magnetic core in particular may be made of magnetic steel or silicon steel. Silicon steel is a special steel tailored for producing specific magnetic properties. Silicon steel may include up to 6.5% of silicon. Using silicon steel for the magnetic core results in an electromagnet which allows activating and/or deactivating the elevator brake very efficiently.

The at least one brake disc and the electromagnet may be arranged along a common axis. Such a configuration allows the electromagnet to activate and/or deactivate the elevator brake very efficiently.

The elevator brake may comprise a first metal plate which is arranged between the electromagnet and the at least one brake disc. The first metal plate may be movable parallel to the common axis by energizing the electric coil. The first metal plate in particular may be movable towards the electromagnet and away from the brake disc by energizing the electric coil. Such a configuration allows the electromagnet to activate and/or deactivate the elevator brake very efficiently.

As second metal plate may be arranged on the other side of the at least one brake disc, i.e. on the side of the brake disc facing away from the first metal plate. The second metal plate may be fixed in the axial direction, or it may be arranged next to a support which is fixed in the axial direction and prevents the second metal plate from moving in the axial direction. In such a configuration, the elevator brake may be activated by squeezing the at least one brake disc between the first and second metal plates for generating frictional forces between the at least one brake disc and the metal plates.

The elevator brake may comprise at least one elastic element configured for urging the first metal plate against the at least one brake disc. Such a configuration enhances the safety of the elevator brake as it allows activating the elevator brake without using external (electric) power. Thus, the elevator brake may be activated in case the supply of external (electric) power is interrupted, e.g. due to a power failure.

The elevator brake may comprise a plurality of elastic elements arranged around a common axis. The elastic elements in particular may be arranged on a circle centered at the common axis. Such a configuration allows for an efficient and symmetric activation of the elevator brake.

DRAWING DESCRIPTION

In the following, exemplary embodiments of the invention are described in more detail with respect to the enclosed figures:

FIG. 1 schematically depicts an elevator system in which an elevator brake according to an exemplary embodiment of the invention may be employed.

DETAILED DESCRIPTION

Figure 1:
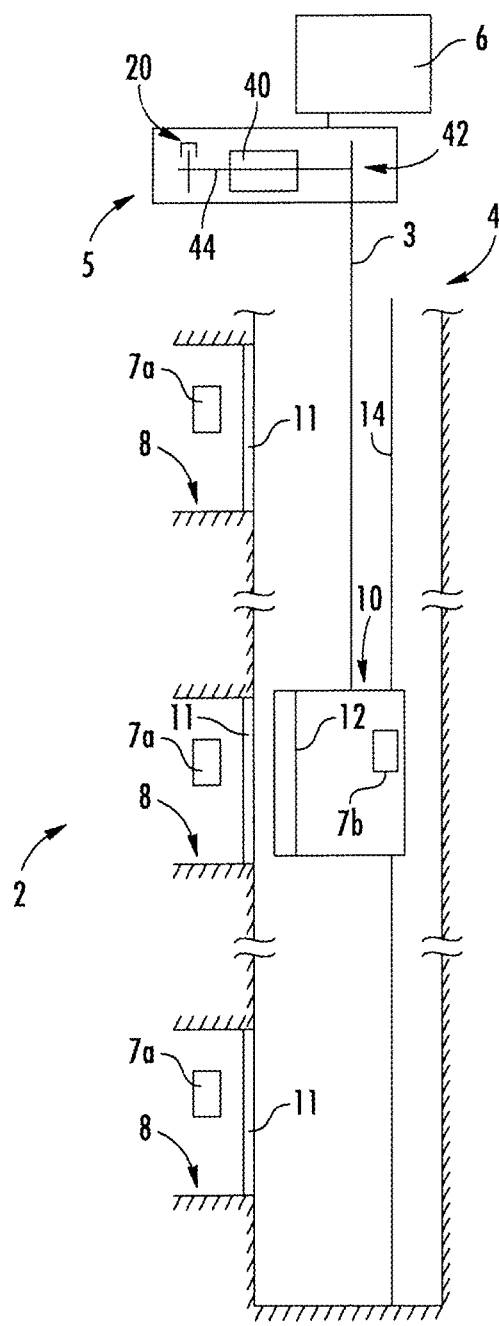

FIG. 1 schematically depicts an elevator system 2 in which an elevator brake 20 according to an exemplary embodiment of the invention may be employed.

The elevator system 2 includes an elevator car 10 movably arranged within a hoistway 4 extending between a plurality of landings 8. The elevator car 10 in particular is movable along a plurality of car guide members 14, such as guide rails, extending along the vertical direction of the hoistway 4. Only one of said car guide members 14 is visible in FIG. 1.

Although only one elevator car 10 is depicted in FIG. 1, the skilled person will understand that exemplary embodiments of the invention may include elevator systems 2 having a plurality of elevator cars 10 moving in one or more hoistways 4.

The elevator car 10 is movably suspended by means of a tension member 3. The tension member 3, for example a rope or belt, is connected to an elevator drive 5, which is configured for driving the tension member 3 in order to move the elevator car 10 along the height of the hoistway 4 between the plurality of landings 8, which are located on different floors.

The elevator drive 5 in particular comprises a motor 40 and a sheave or drum 42, which is mounted to a rotating shaft 44 driven by the motor 40. The tension member 3 extends over the outer periphery of the sheave or drum 42 so that the elevator car 10 may be moved by rotating the sheave or drum 42.

The elevator drive 5 is provided with an elevator brake 20, which allows braking the rotating shaft 44 and, in consequence, the movement of the elevator car 10. Details of the elevator brake 20 will be discussed further below with reference to FIGS. 2 and 3.

Each landing 8 is provided with a landing door 11, and the elevator car 10 is provided with a corresponding elevator car door 12 for allowing passengers to transfer between a landing 8 and the interior of the elevator car 10 when the elevator car 10 is positioned at the respective landing 8.

The exemplary embodiment of the elevator system 2 shown in FIG. 1 employs a 1:1 roping for suspending the elevator car 10. The skilled person, however, easily understands that the type of the roping is not essential for the invention and that different kinds of roping, e.g. a 2:1 roping, may be used as well. The elevator system 2 may have a machine room or may be a machine room-less elevator system. The elevator system 2 may use a tension member 3, as it is shown in FIG. 1, or it may be an elevator system without a tension member 3. The elevator drive 5 may be any form of drive used in the art, e.g. a traction drive, a hydraulic drive or a linear drive.

Optionally, the elevator system 2 may further include a counterweight (not shown) attached to the tension member 3 and moving concurrently and in opposite direction with respect to the elevator car 10 along at least one counterweight guide member (not shown).

The tension member 3 may be a rope, e.g. a steel wire rope, or a belt. The tension member 3 may be uncoated or may have a coating, e.g. in the form of a polymer jacket. In a particular embodiment, the tension member 3 may be a belt comprising a plurality of polymer coated steel cords (not shown). The elevator system 2 may have a traction drive including a traction sheave for driving the tension member 3.

The elevator drive 5 is controlled by an elevator control 6 for moving the elevator car 10 along the hoistway 4 between the different landings 8.

Input to the elevator control 6 may be provided via landing control panels 7a, which are provided on each landing 8 in the vicinity the landing doors 11, and/or via an elevator car control panel 7b provided inside the elevator car 10.

The landing control panels 7a and the elevator car control panel 7b may be connected to the elevator control 6 by means of electric wires, which are not shown in FIG. 1, in particular by an electric bus, such as a field bus/CAN-bus, or by means of wireless data connections.

Figure 2:
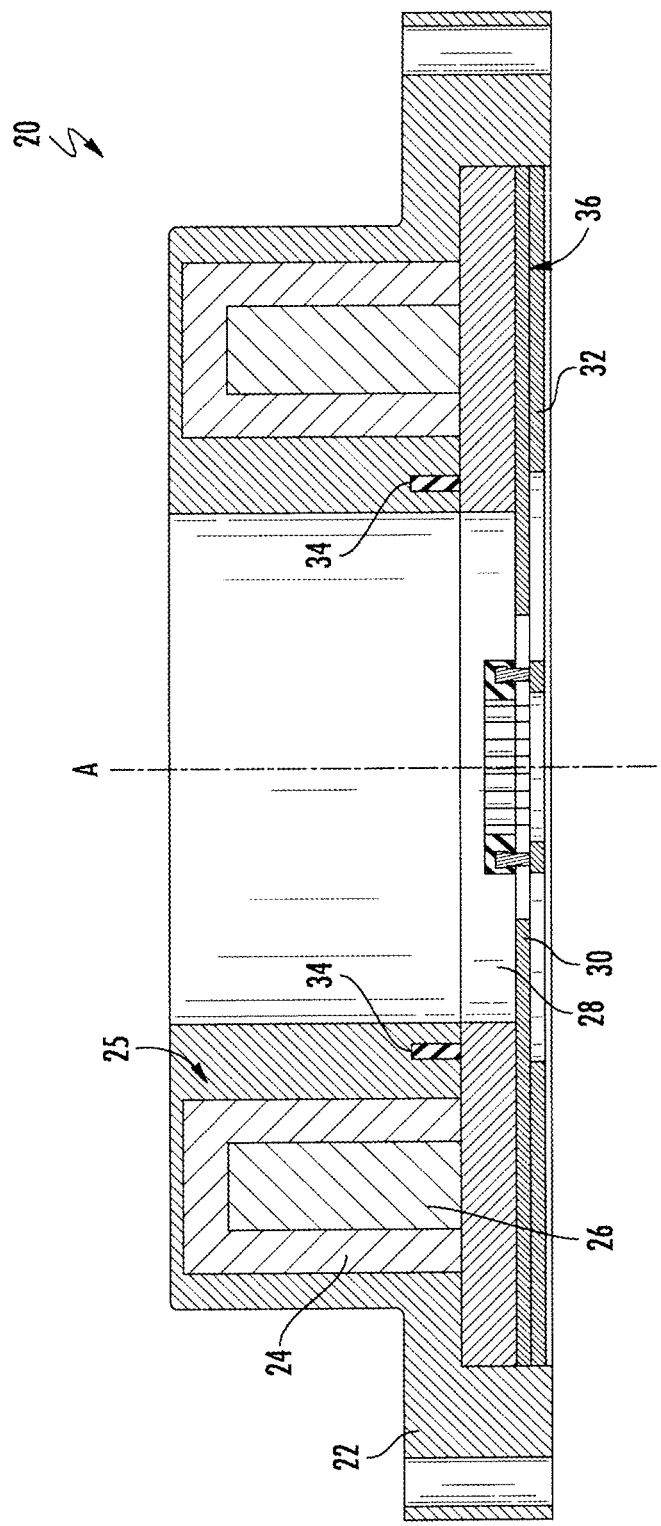
FIG. 2 shows a sectional side view through an elevator brake according to an exemplary embodiment of the invention.
Figure 3:
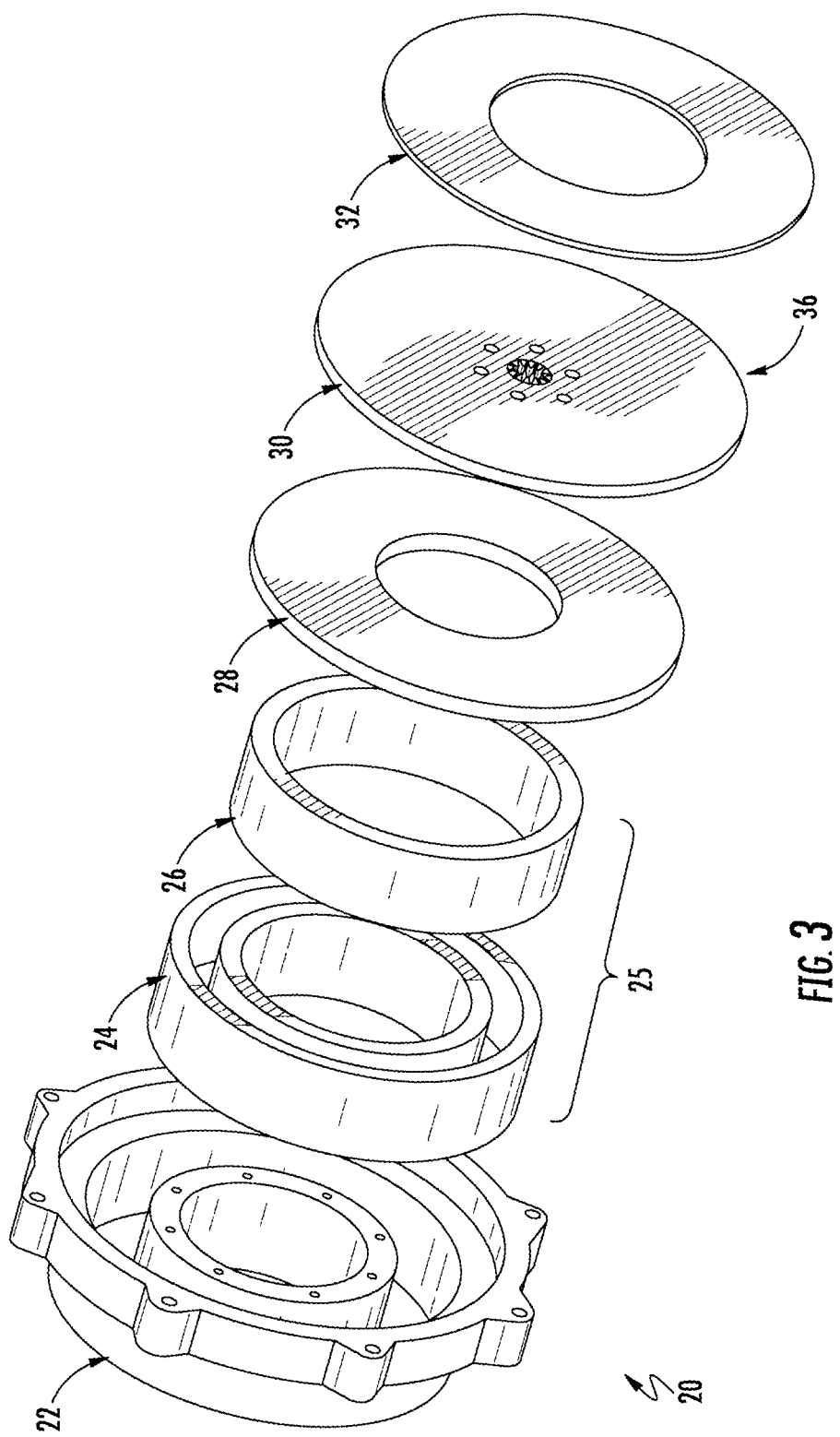
FIG. 3 shows an explosive view of the elevator brake depicted in FIG. 2.

FIG. 2 shows a sectional side view through an elevator brake 20 according to an exemplary embodiment of the invention, and FIG. 3 shows an explosive view thereof.

When the elevator brake 20 depicted in FIGS. 2 and 3 is installed in an elevator system 2 as it is depicted in FIG. 1, the rotating shaft 44 connected with the sheave 42 (cf. FIG. 1, the rotating shaft 44 and the sheave 42 are not shown in FIGS. 2 and 3) extends through the elevator brake 20 along an axis A, which is depicted in FIG. 2.

A brake disc 30 is form fittingly mounted to the rotating shaft 44 so that it rotates integrally with said rotating shaft 44. In consequence, any rotation of the rotating shaft 44 may be braked by braking the brake disc 30.

The brake disc 30 comprises, or consists of, an aluminum matrix composite. The metal matrix composite in particular may be the main component of the brake disc 30.

The aluminum matrix composite comprises Aluminum 6061, silicon carbide (SiC) and redmud. Redmud has a good wettability with aluminum alloys and it is normally available at low costs as it is an industrial waste product. The matrix composite obtained has a refined grain size attributed to the uniform distribution of the redmud particles acting as nuclei restricting the grain growth during the solidification process.

The brake disc 30 is sandwiched between a first metal plate 28 and a second metal plate 32. The brake disc 30 as well as the first and second metal plates 28, 32 are provided in the form of circular discs centered around the axis A. The brake disc 30 and the first and second metal plates 28, 32 in particular may have the same or basically the same diameter.

The brake disc 30 and the first metal plate 28 are movable along the rotating shaft 44 (which is not shown in FIGS. 2 and 3) parallel to the axis A. The first metal plate 28 in particular is movable towards and away from the brake disc 30.

The elevator brake 20 further comprises a casing 22 housing an electromagnet 25. The casing 22 may be made of a synthetic material, in particular a material comprising polyamide.

The electromagnet 25 is formed as a ring centered at the axis A. The electromagnet 25 comprises a ring-shaped electric coil 26, which in particular may be made of copper windings, and a ring-shaped magnetic core 24. The magnetic core 24 may comprise or may be made of silicon steel, in particular a steel material comprising up to 6.5% of weight of silicon.

Using a polyamide material for the casing 22 and silicon steel for the magnetic core 24 allows reducing the total weight of the elevator brake 20.

The elevator brake 20 further comprises a plurality of elastic elements 34, such as springs, in particular spiral springs, supported by the casing 22. The elastic elements 34 in particular may be arranged on a virtual circle formed in a plane oriented perpendicularly to the axis A, with the axis A extending through the center of said circle. In other words, all elastic elements 34 may be arranged at the same distance from the axis.

In an alternative configuration, the elastic elements 34 may be arranged in different distances from the axis A. The plurality of elastic elements 34 in particular may include different groups of elastic elements 34, with the elastic elements 34 of each group being arranged on a common circle, i.e. in the same distance from the axis A, respectively.

The elastic elements 34 in particular may be arranged equidistantly along the virtual circle(s).

The elastic elements 34 are arranged in a configuration in which a first end of each elastic element 34 is accommodated within and supported by the casing 22, and an opposing second end of the elastic element 34 contacts the first metal plate 28. The elastic elements 34 are configured for urging the first metal plate 28 against the brake disc 30, thereby urging the brake disc 30 against the second metal plate 32. The second metal plate 32 is either fixed so that it is not movable, or it is pressed against a stationary support (not shown), which is not movable in the axial direction, thereby preventing the second metal plate 32 from being moved in the axial direction along the rotating shaft 44.

As a result, the brake disc 30 is squeezed between the first and second metal plate 28, 32. Friction generated between the brake disc 30 and the first and second metal plates 28, 32 brakes any rotation of the brake disc 30. In order to increase the friction between the brake disc 30 and the first and second metal plates 28, 32 at least one surface of the brake disc 30 or at least one of the surfaces of the first and second metal plates 28, 32 facing the brake disc 30 may be covered with a friction enhancing lining 36.

For releasing the elevator brake 20 and allowing the brake disc 30 (and the rotating shaft 44) to rotate, a sufficiently large electric current is flown through the electric coil 26. This generates an electromagnet field attracting the first metal plate 28. In consequence, the first metal plate 28 is moved against the elastic force provided by the elastic elements 34 away from the brake disc 30. This reduces or even eliminates the frictional forces generated between the brake disc 30 and the first and second metal plates 28, 32.

For engaging the elevator brake 20, the electric current flowing through the electric coil 26 is switched-off. Optionally, the electric current flowing through the electric coil 26 may be gradually or continuously reduced for causing a soft engagement of the elevator brake 20.

The friction occurring between the brake disc 30 and the first and second metal plates 28, 32 when the elevator brake 20 is activated, may result in high temperatures of the brake disc 30 and/or of the first and second metal plates 28, 32. High temperatures of the brake disc 30 in particular may occur in case the elevator car 30 is braked, in particular stopped, from high speed. Extreme cases include situations in which the elevator car 30 moves with high speed and needs to be stopped within a short period of time, such as in an emergency situation.

In order to allow operating the elevator system 2 safely when moving the elevator car 10 with high speed, it is necessary that the heat generated by the friction between the brake disc 30 and the first and second metal plates 28, 32 is sufficiently distributed and dissipated in order to avoid that the brake disc 30 and/or the first and second metal plates 28, 32 are damaged due to overheat.

A brake disc 30 according to an exemplary embodiment of the invention has low wear and allows for a good and fast distribution and dissipation of the frictional heat. The thermal energy of local hot spots occurring on the brake disc 30 as a result of friction during the braking can be distributed efficiently due to the high thermal conductivity of silicon carbide.

A brake disc 30 according to an exemplary embodiment of the invention therefore allows providing an elevator brake 20 having a large braking capacity which may be used for braking the elevator car 10 from high speeds and with large decelerations, if necessary. Such an elevator brake 20 allows moving the at least one elevator car 10 with high speed without degenerating the safety of the elevator system 2.

A brake disc 30 according to exemplary embodiments of the invention may be provided at comparatively low costs. In particular, brake discs made of alternative materials, as they are known in the art, would be more expensive. Using such alternative materials further would result in very hard brake discs. A high hardness limits its workability. Extruding such materials, for example, would be very complicated. Further, the manufacturing of such materials may generate pores in the composite reducing the strength of the composite itself. Thus, in order to avoid the generation of pores, additional controls of the manufacturing process, which would increase the manufacturing costs, would be necessary.

Although the described and depicted exemplary embodiment comprises only one brake disc 30, one first metal plate 28 and one second metal plate 32, respectively, the skilled person understands that configurations comprising multiple brake discs 30 and/or metal plates 28, 32 arranged on a common rotating shaft 44 may be employed for increasing the braking capacity of the elevator brake 20. Similarly, two or more elevator brakes 20 acting on the same rotating shaft 44 may be provided in an elevator system 2 in order to increase the overall braking capacity and to enhance the safety of the elevator system 2 due to redundancy.

While the invention has been described with reference to exemplary embodiments, it will be understood by those skilled in the art that various changes may be made and equivalents may be substituted for elements thereof without departing from the scope of the invention. In addition, many modifications may be made to adopt a particular situation or material to the teachings of the invention without departing from the essential scope thereof. Therefore, it is intended that the invention shall not be limited to the particular embodiment disclosed, but that the invention includes all embodiments falling within the scope of the dependent claims.

REFERENCES 2 elevator system
3 tension member
4 hoistway
5 drive
6 elevator control
7a landing control panel
7b elevator car control panel
8 landing
10 elevator car
11 landing door
12 elevator car door
14 car guide member
20 elevator brake
22 casing
24 magnetic core
25 electromagnet
26 electric coil
28 first metal plate
30 brake disc
32 second metal plate
34 elastic element
36 friction enhancing lining
40 motor
42 sheave or drum
44 rotating shaft

What is claimed is:

1. An elevator brake (20) with at least one brake disc (30) comprising a metal matrix composite including at least an aluminum alloy and silicon carbide and redmud, wherein the redmud comprises aluminum oxide.

2. The elevator brake (20) according to claim 1, wherein the aluminum alloy comprises magnesium and silicon.

3. The elevator brake (20) according to claim 2, wherein the aluminum alloy is Aluminum 6061.

4. The elevator brake (20) according to claim 1, wherein the metal matrix composite comprises 7% to 10% by weight of redmud.

5. The elevator brake (20) according to claim 4, wherein the metal matrix composite comprises 8% to 9% by weight of redmud.

6. The elevator brake (20) according to claim 1, wherein the metal matrix composite comprises between 3% and 25% by weight of silicon carbide.

7. The elevator brake (20) according to claim 6, wherein the metal matrix composite comprises 15% by weight of silicon carbide.

8. The elevator brake (20) according to claim 1, wherein the at least one brake disc (30) comprises a friction enhancing lining (36).

9. An elevator system (2) comprising:
at least one elevator car (10) configured for traveling along a hoistway (4) between a plurality of landings (8);
an elevator drive (5) configured for driving the at least one elevator car (10); and
the elevator brake (20) according to claim 1 configured for braking the movement of the at least one elevator car (10) and/or for holding the elevator car (10) at a desired position.

10. The elevator brake (20) according to claim 1, wherein the redmud comprises redmud particles.

11. An elevator brake (20) with at least one brake disc (30) comprising a metal matrix composite including at least an aluminum alloy and silicon carbide and a casing (22) including polyamide.

12. An elevator brake (20) with at least one brake disc (30) comprising a metal matrix composite including at least an aluminum alloy and silicon carbide and an electromagnet (25) including an electric coil (24) and a magnetic core (26) including silicon.

13. The elevator brake (20) according to claim 12, wherein the at least one brake disc (30) and the electromagnet (25) are arranged along a common axis (A).

14. The elevator brake (20) according to claim 13 further comprising a first metal plate (28) which is arranged between the electromagnet (25) and the at least one brake disc (30), and which is movable parallel to the common axis (A) by energizing the electric coil (24).

15. The elevator brake (20) according to claim 14 comprising at least one elastic element (34) which is configured for urging the first metal plate (28) against the at least one brake disc (30).

16. The elevator brake (20) according to claim 15 comprising a plurality of elastic elements arranged around the common axis (A).

17. The elevator brake (20) according to claim 16, wherein the plurality of elastic elements are arranged on a circle centered at the common axis (A).

18. The elevator brake (20) according to claim 12, wherein the magnetic core (26) includes silicon steel.

* * * * *